United States Patent [19]
Martens et al.

[11] Patent Number: 4,809,924
[45] Date of Patent: Mar. 7, 1989

[54] HYDRAULIC BUMPER

[76] Inventors: Marvin Martens, 126 Waldon Ave., Fairview, Okla. 73737; Wilfred Toews, R.R. #1, Hunter, Okla. 74640

[21] Appl. No.: 75,514

[22] Filed: Jul. 20, 1987

[51] Int. Cl.⁴ .............................................. B60P 3/035
[52] U.S. Cl. .......................... 242/86.5 R; 224/42.03 R; 293/117; 414/24.5; 414/669; 414/685; 414/911
[58] Field of Search .................... 224/42.03 R, 42.05, 224/42.37, 42.43; 293/117; 414/24.5, 24.6, 555, 558, 665, 669, 685, 911; 242/86.5 R

[56] References Cited
U.S. PATENT DOCUMENTS

| | | | |
|---|---|---|---|
| 3,992,047 | 11/1976 | Barényi et al. | 293/117 X |
| 4,412,768 | 11/1983 | Bauer et al. | 414/24.5 |
| 4,437,622 | 3/1984 | Heider | 242/86.5 R |
| 4,473,196 | 9/1984 | Sammann et al. | 242/86.5 R |
| 4,579,497 | 4/1986 | Nine | 414/24.6 X |
| 4,674,933 | 6/1987 | Brown | 414/24.5 X |

Primary Examiner—Robert J. Spar
Assistant Examiner—Janice Krizek
Attorney, Agent, or Firm—Head & Johnson

[57] ABSTRACT

A hydraulic bumper mechanism for moving bales. A modified rear bumper is used on pick up trucks. Extending forwardly from the bumper is a pair of spaced apart housings which retain hydraulic cylinders. The front end of the cylinders and the piston portion thereof faces to the rear of the truck and each is attached to a receptacle that is rotatably attached to a common shaft. These receptacles are adapted to receive round bale piercing spears. When in the horizontal position as the truck is backed up into the bale these spears stab into the bales. Once the bale is stabbed, the hydraulic cylinders are actuated outwardly to cause rotation of the receptacles, of the spears and of the attached round bale of hay. A variety of other tools can be used with it and include a wire winder and a pallet mover. An auxiliary hydraulic kit is also incorporated with the modified bumper.

8 Claims, 6 Drawing Sheets

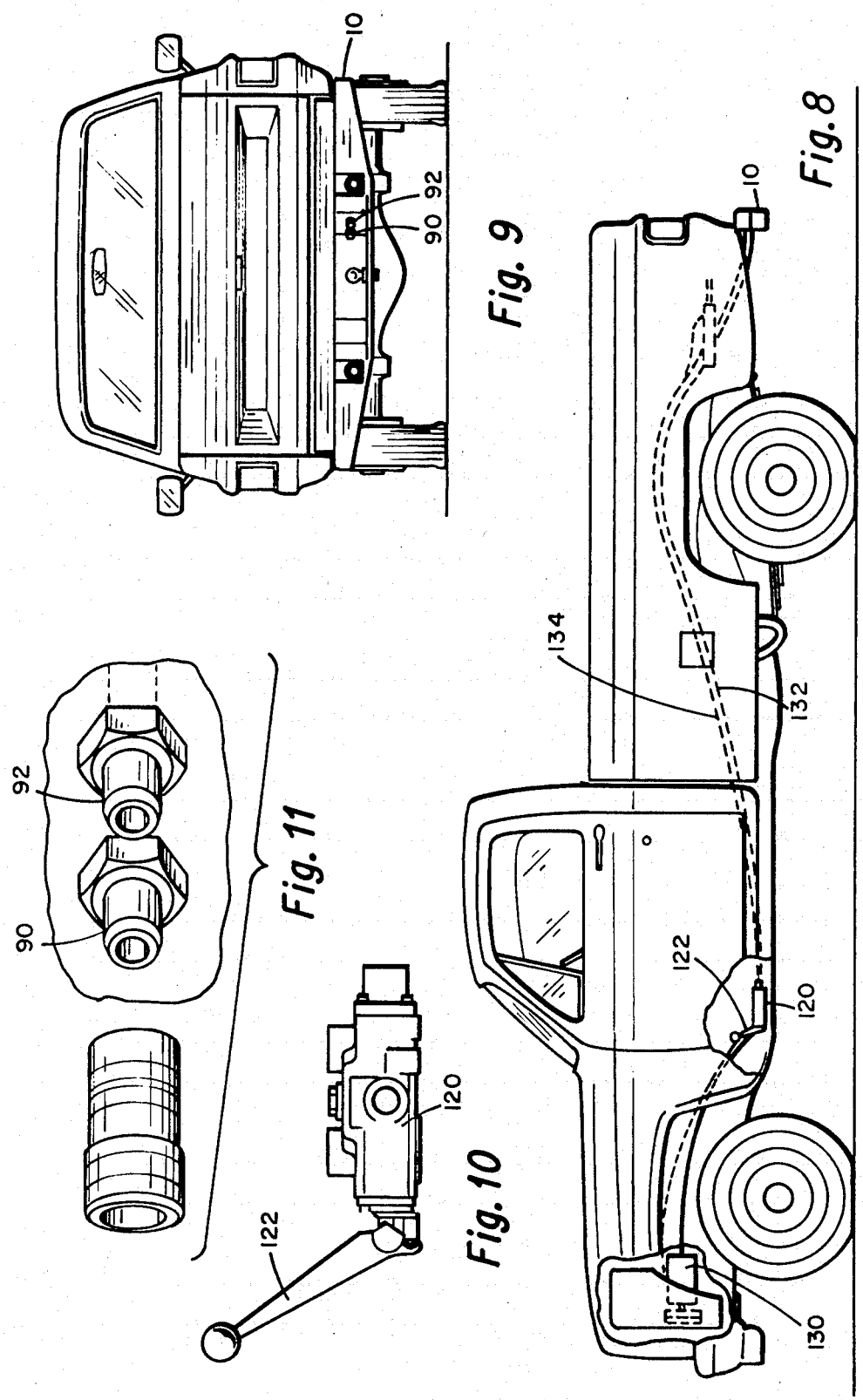

HYDRAULIC BUMPER

DISCLOSURE STATEMENT

A search revealed the following U.S. Pat. Nos.:
4,044,963 Hostetler
4,412,768 Bauer et al.
4,564,325 Ackerman
4,579,497 Nine
4,594,041 Hostetler The Bauer et al patent has a modified bumper in that the central portion of the bumper is designed to pivot about a generally horizontal axis between a normal position and a bale-carrying position utilizing hydraulic power to pivot the bumper itself. The Hostetler patent '963 is a round bale loader, unloader and unroller from landing on the rear of a flatbed truck. That loader grips opposite sides of a round bale on a ground surface.

BACKGROUND OF THE INVENTION

This invention relates generally to the handling of large round hay bales or other objects and to an apparatus attachable to the rear end of a truck for lifting such loads.

A large part of the hay that is baled these days is baled in large cylindrical bales which can weigh up to several thousands of pounds. These large size hay bales have led to a need for equipment capable of properly handling such bales. Several mechanisms have been developed to handle these large bales. A lot of them have been used with trucks to carry large bales and most of those have added equpment and accessories in the truck bed that then is not fully available for handling or normal loads. U.S. Pat. No. 4,412,768 is directed to an improved hay handling device which functions both as a rear truck bumper and as a bale carrier and includes a rear truck bumper which is formed by two stationary end sesctions and a pivotal center section. Here the whole middle section of the bumper pivots which may tend to weaken the bumper.

SUMMARY OF THE INVENTION

This is an apparatus which includes a bumper for the rear end of a pickup truck. The bumper has a first pocket on the left side and a second pocket on the right side, although the bumper is complete all the way across the rear of the truck. A first receptacle sets in the first bumper pocket and a second in the second pocket. Each receptacle has two arms which are spaced apart a selected degree, preferably ninety degrees. The bumper supports a horizontal shaft which is pivotally attached to one of the arms of each receptacle. The second arm of each receptacle is provided with a tool receiving hole.

A first and second housing are fixed to the bumper adjacent the pockets on the front side thereof. Each housing contains a hydraulic cylinder connected at the front end to the housing and a piston rod extends out the rear end. This piston rod is connected to the receptacle such that movement of the piston rod rotates the receptacle about the pivot point which is the shaft fixed to the bumper. Tools such as spears or tines are inserted in these tool receiving holes and extend outwardly from the rear of the truck two or more feet.

In operation a truck is backed into a round bale of hay so that the spears are embedded in the hay. Then hydraulic fluid is supplied to the hydraulic cylinder driving the piston rods backwardly. This forces the receptacles to rotate about the common shaft and thus lift the bales off the ground. When the bale of hay has been moved to its desired location the hydraulic cylinders are moved in the opposite direction, thus lowering the bale of hay back to the ground.

Various other tools can be adapted to this arrangement. For example, a pallet lifting fork may be inserted into the receptacle holes instead of the hay spears. Then barrels, logs and the like can be lifted. Another attachment is a wire winder which is powered by auxiliary hydraulic couplings extending out of the rear end of the bumper. A wired decoiler is also provided and is supported by the receptacles and rotated as necessary. Also provided is an auxiliary hydraulic kit which provides hydraulic equipment for any desired operation.

BRIEF DESCRIPTION OF THE DRAWINGS

FIG. 8 illustrates the positioning of hydraulic lines for use of my invention on a pickup truck.

FIG. 9 illustrates the rear end of a pickup truck with the bumper of my invention mounted thereon.

FIG. 10 illustrates a two section valve.

FIG. 11 illustrates breakaway couplings for auxiliary hydraulics.

DETAILED DESCRIPTION OF THE INVENTION

Figure 1:
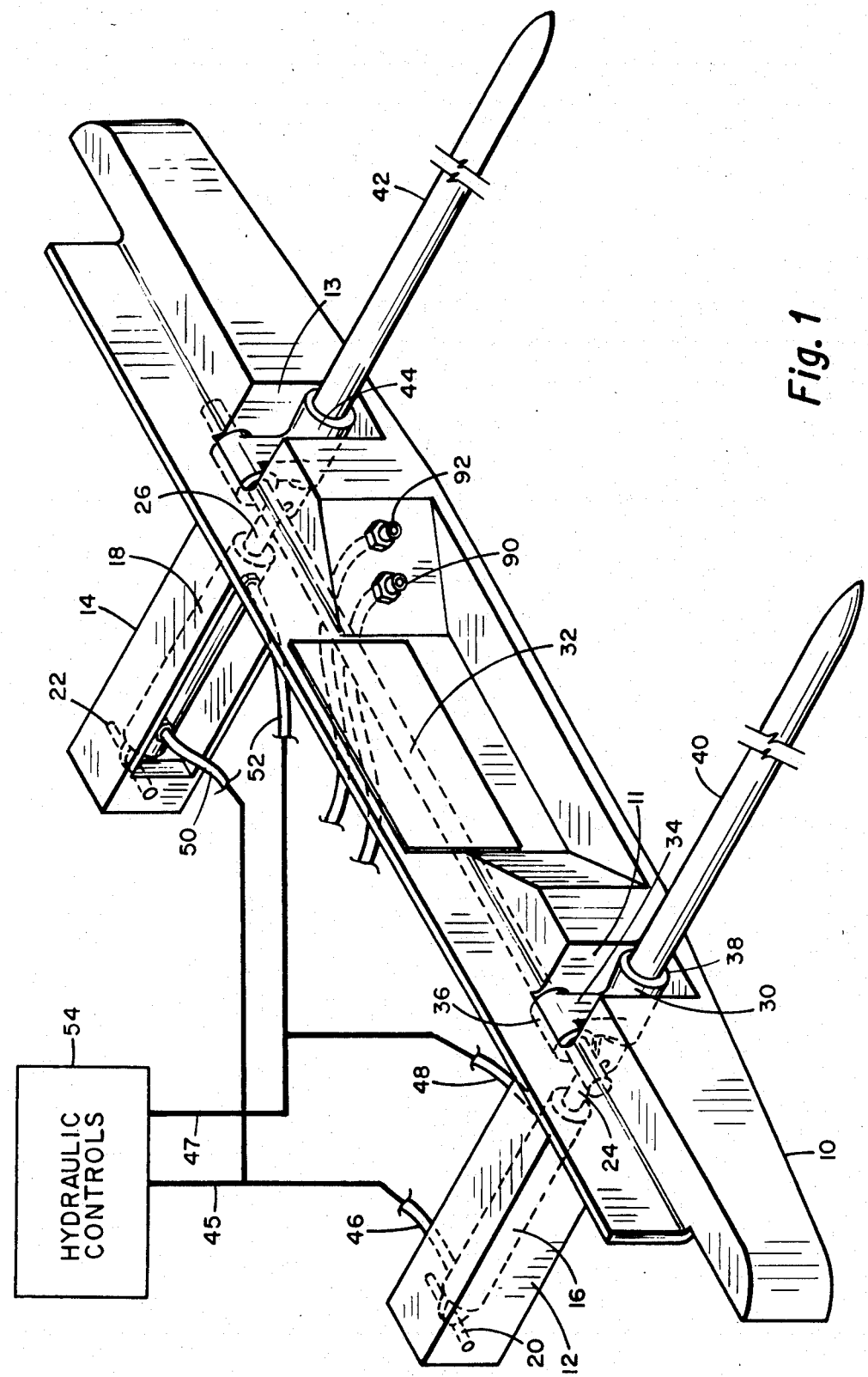
FIG. 1 illustrates a pickup bumper hay bale lifter of my invention.

Attention is first directed to FIG. 1 which shows a bumper 10 having first and second rearwardly opening pockets 11 and 13. Bumper 10 which when in use, is attached to the back of a pickup as shown in FIGS. 8 and 9. Associated with bumper 10 and extending forwardly therefrom is a first housing 12 and a second housing 14 which retains, respectively, hydraulic cylinders 16 and 18 therein. The front end of the cylinder is fixed at points 20 and 22 to the front of the housing 12 and 14. The rear ends of hydraulic cylinders 16 and 18 are provided with piston rods 24 and 26, respectively. As shown more clearly in FIGS. 2, 3, and 4 piston rod 24 is connected through pivot 28 to a receptacle 30. A shaft 32 is supported from the bumper. Receptacle 30 has a pivot arm 34 which has a head or pivot nipple 36 through which shaft 32 extends.

Receptacle 30 has an open tool receiving cavity or hole 38. Shown mounted therein is a tine or hay piercing spear 40. A second tine 42 is also provided for receptacle 44 which is on the right hand side of the drawing of FIG. 1 and is mounted and operates identically to the mounting of receptacle 30. The outer end of these tines 40 and 42 are pointed so that they can be driven into a round bale of hay, for example.

Figure 2:
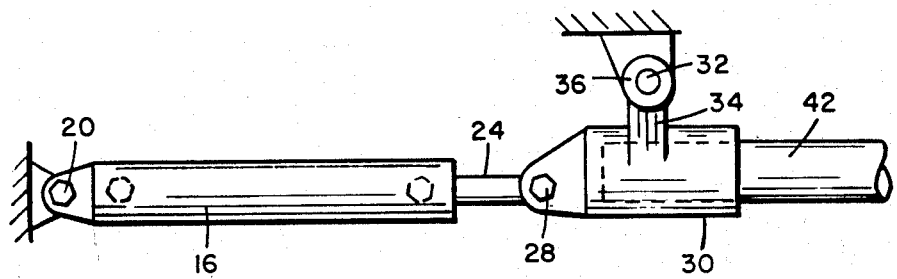
FIG. 2 shows a position of the hydraulic cylinder and pivot arm when the tine or spear is in a horizontal position.
Figure 3:
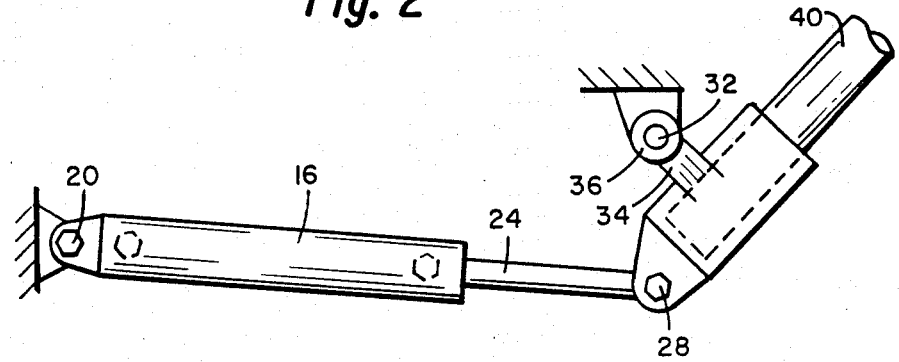
FIG. 3 is similar to FIG. 2 but shows the position of the tine when the cylinder rod is partially extended.
Figure 4:
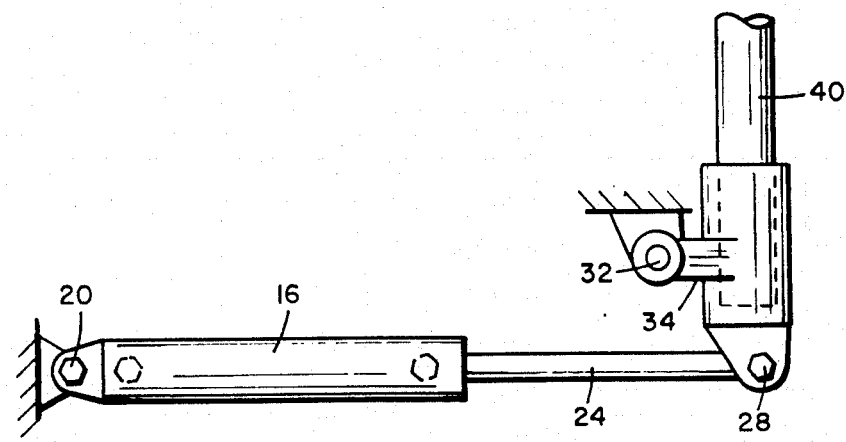
FIG. 4 is similar to FIG. 3 except that the rod from the hydraulic cylinder has been extended so that the tine is in a vertical position.

Hydraulic control lines 46 and 48 are provided for hydraulic cylinder 16 and hydraulic power lines 50 and 52 are provided for cylinder 18. They are controlled by hydraulic control 54. Power fluid provided in line 46 drives the cylinder piston outwardly and power fluid injected through line 48 retracts the piston 24. Extension of hydraulic cylinder 16 and likewise extension of piston rod 24 causes the tines 40 and 42 to rotate about shaft 32. FIG. 2 shows its tine in a horizontal position. FIG. 3 shows that the piston rod 24 has been extended some and so the tine 40 is extended at about forty five degrees with the horizontal. Further extension of the piston rod 24 as illustrated in FIGURE 4 shows the maximum extension with the tine 40 in a vertical position. Normally tines 40 and 42 are used for moving large round bales of hay. The tines 40 and 42 are forced into the bale and then hydraulic fluid is provided through lines 46 and 50 to extend piston rod 24 and 26 so that tines 40 and 42 will be rotated to a vertical position as shown in FIG. 4. The bale is supported during this time by tines 40 and 42 and when they are in an upright position the hay will not readily fall off the tines while the pickup truck is driven to proper location. The round bales of hay can be easily moved without any great effort on the part of the operator. When the bales of hay are taken to the position where they are to be stored or fed, the reverse of FIGS. 2, 3 and 4 applies. The pressure of hydraulic fluid will be applied through lines 48 and 52 to retract piston rods 24 and 26 and as they are retracted the receptacle 30 will be rotated about pivot 32 from the vertical postion shown in FIG. 4 to the horizontal position shown in FIG. 2. Then the tines can be removed from the bale of hay by driving forward with the pickup.

By the use of my invention I keep the bed of the truck open and free of any part of the mechanism. The tines are bale piercing spears and are made removable from the tool receiving holes of the receptacles and as will be seen other auxiliary equipment can be used. This provides for a clean compact design allowing full use of the truck for other activity.

Figure 5:
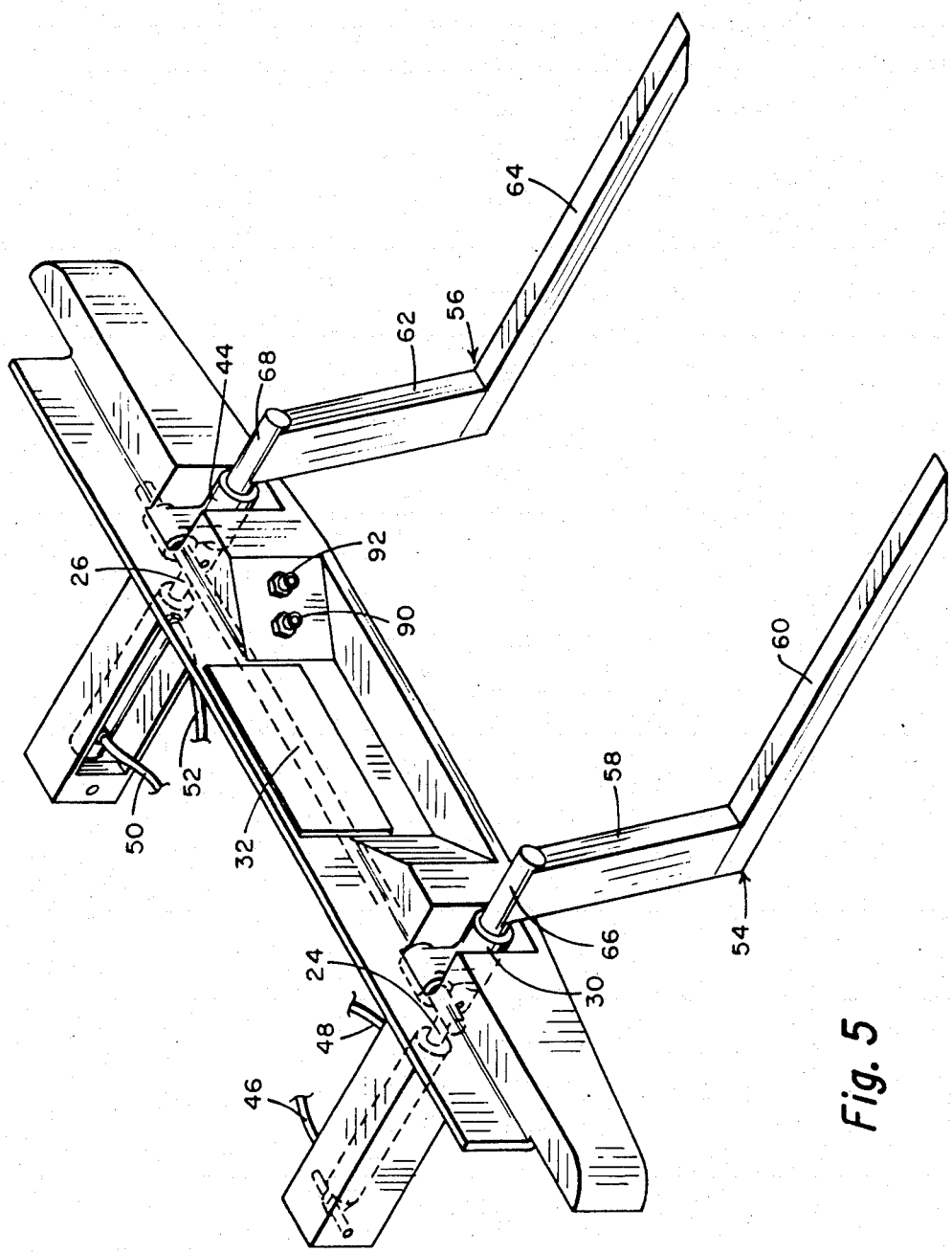
FIG. 5 is a modification of the embodiment of FIG. 1 and shows a lift fork attachment.

The apparatus of FIG. 1 is readily convertible into a forklift type device as illustrated in FIG. 5. This includes a first L-shaped arm 54 and a second L-shaped arm 56. First arm 54 has the first postion 58 and the second portion 60. Second arm 56 has a first or upper portion 62 and a horizontal or second portion 64. The upper ends of sections 58 and 62 are provided with attaching rods 66 and 68, respectively, which fit into receptacle tool receiving holes 38 similarly as the ends of tines 40 and 42. By applying hydraulic fluids through lines 46, 48 and 50 and 52 the piston rods 24 and 26 can be extended or retracted to rotate receptacles 30 and 44 similarly as in the description of FIG. 1. The forklifts 60 and 64 can be used as a pallet mover. Many products come on pallets and this pallet mover will lift and transport heavy loads. This feature is parctical for moving such loads on a short haul basis and is handy for gathering material around the farm, shop or workplace where a forklift is not available. It can also be used as a barrel hauler by putting the barrel across the tines 60 and 64 and rotating the receptacles about shaft 32. The barrel will then be cradled between arms 58, 60, and 62 and 64. When the forklift is raised to the highest position such as illustrated in FIG. 4 for rotation of the receptacle, drums can be rolled off of the forks to the bed without physically lifting or straining. Other objects such as posts can also be used. These forks shown in FIG. 5 can also be used in hauling round bales where the twine has deteriorated. These forks cradle the bale during transit.

Figure 6:
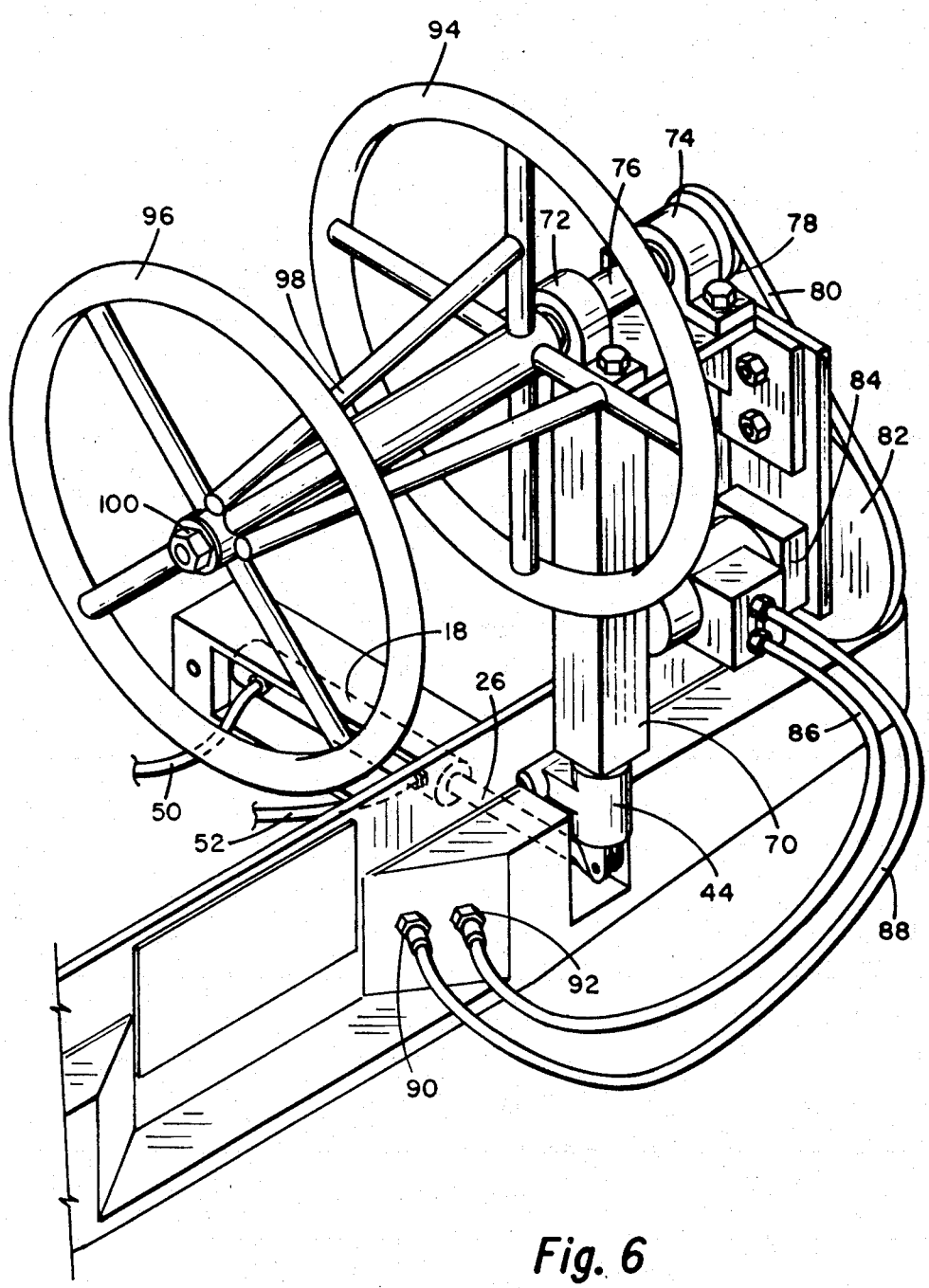
FIG. 6 is another embodiment of my invention using a wire winder.

Attention is also next directed to FIG. 6 which shows a wire winder. This device is hydraulically powered with a hydraulic motor and may be inserted in either the right or left pocket of the material handler bumper. Shown in FIG. 6 is a support member 70 which has a tool end for insertion into the tool receiving hole of receptacle 44. The upper end of support 70 supports housing member 72 and housing member 74 through which shaft 76 extends. Shaft 76 is driven by pulley 78 which is driven by belt 80 which in turn is driven by shaft 82 which is driven by hydraulic motor power through lines 86 and 88 which are connected to auxiliary hydraulic supply hookups 90 and 92.

Shaft 76 supports a wire spool mechanism which includes a first wheel 94, a second wheel 96 which has spool supporting members 98 extending between the spokes of the wheels 94 and 96. The spool receiving members 98 are not attached to wheel 96. A nut assembly 100 can be used to secure and remove from shaft 76 the wheel 96 and the spool mounted over the spool receiving members 98. By actuating hydraulic motor 84 shaft 76 will be driven by belt 80 and this in turn will drive wheel 94 which will in turn rotate the spool mounted thereon so that wire may be wound onto the spool.

Figure 7:
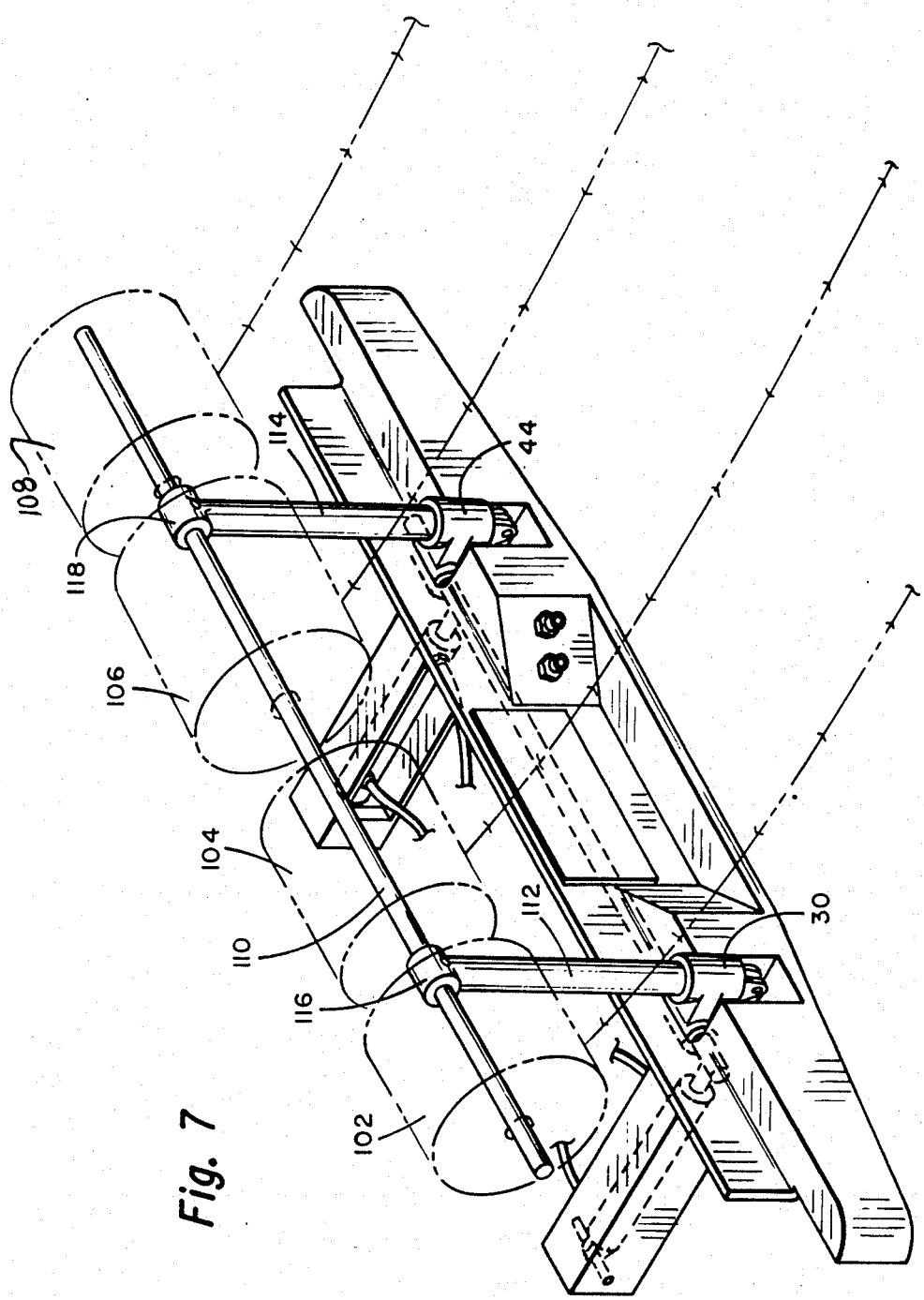
FIG. 7 illustrates a wire decoiler.

Attention is next directed to FIG. 7 which shows the mechanism being used as a wire decoiler. Spools of wire 102, 104, 106 and 108 indicated by broken lines are mounted on mounting bar 110 which is supported by lifting arms 112 and 114. Lifting arms 112 and 114 fit into receptacles 30 and 44. These arms 112 and 114 are rotated in a like manner as to tines 40 and 42 of FIG. 1. Mounting bar 110 may be inserted through the center of spool 102, connecting head 116 on the top end of arm 112 through spool 104, through spool 106, through head 118 of lifting arm 114 and through spool 108 while the arms 112 and 114 are in a horizontal position. Wire may then be unwound from all four spools 102, 104, 106 and 108.

Attention is now directed to FIGS. 8, 9 and 10. FIG. 10 shows a two section commercially available hydraulic valve 120 which is of the type which can direct hydraulic fluid through either line 45 to lines 46 and 50 to extend pistons 24 and 26 or through line 47 to lines 48 and 52 to retract such pistons. This will rotate receptacles 30 and 44 as indicated above. When in a second position valve 120 can control the fluids to or from auxiliary hydraulic connections 90 and 92. This two section valve thus supplies basic operational pressure for the rear oscillating mechanism, i.e., cylinder 16 and 18 and then to the optional auxiliary hydraulic kit available through the breakaway couplings 90 and 92. This auxiliary hydraulic kit allows for many uses such as transporting machinery which is raised and lowered hydraulically. The hydraulic breakaway is located at the draw bar area of the bumper to allow for easy access to the hydraulic system. The mechanism may be controlled from the cab through handle 122 or it may be located at the rear of the truck. The hydraulic power motor 130 of FIG. 8 can be provided adjacent the motor of the vehicle and driven by any well known means to provide hydraulic fluid to the valve 120. Main hydraulic line 132 and auxiliary lines 134 may be provided to provide fluids to the hydraulic cylinders 16 and 18 and to the hydraulic connectors 90 and 92.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for mounting on the rear end of a truck which comprises:
   a bumper non-rotatably attached to and extending substantially across the rear end of said truck and having a first pocket and a second pocket;
   a first housing fixed with respect to the front side of said bumper adjacent said first pocket;
   a second housing fixed with respect to said bumper on the front side thereof adjacent said second pocket;
   a first hydraulic cylinder mounted in said first housing and attached at the first cylinder's front end to said housing and a first piston rod extending out the other end of the first cylinder;
   a second hydraulic cylinder mounted in said second housing with the front end of the second cylinder attached to said housing and the other end of the second cylinder having a second piston rod extending outwardly;
   a shaft extending along said bumper member;
   a first and a second receptacle each having a first arm and a second arm disposed at an angle with respect to each other, each said first arm having a hollow head through which said shaft is mounted and the second arm having a tool receiving hole;
   means connecting the end of said piston rod of said first hydraulic cylinder to said first receptacle and a second means connecting said piston rod of said second hydraulic cylinder to said second receptacle whereby when said piston rods are extended, said receptacles rotate in one direction about said shaft at the center of rotation and when said piston rods are retracted said receptacles rotate in the opposite direction.

2. Apparatus as defined in claim 1 including round tines insertable into said receptacle tool receiving holes.

3. Apparatus as defined in claim 1 including a first and second lift fork each with an attaching member insertable into said receptacle tool receiving hole.

4. An apparatus as defined in claim 1 including a wire winder which comprises a support bar insertable in one of said receptacles;
   a hydraulic motor supported by said support bar;
   a spool shaft;
   means to rotate said shaft by said motor;
   a spool receiving member mounted on said spool shaft.

5. An apparatus as defined in claim 4 in which said spool receiving member includes a first wheel supported on said spool shaft such that rotation of such spool shaft rotates said wheel, and in which said spool receiving member extends in one direction from said wheel;
   a second wheel removably supported by said spool shaft at a fixed spaced distance from said first wheel.

6. An apparatus as defined in claim 1 including:
   a lifting arm having a first end and a second end with a hollow head on said first end;
   a second lifting arm having a first end and a second end, with a second hollow head on said first end of the second lifting arm;
   the second end of each said lifting arm insertable into said tool receiving hole; and,
   a mounting bar insertable through said hollow heads for receiving spools of wire which are to be decoiled.

7. An apparatus for mounting on the rear end of a truck which comprises:
   a bumper non-rotatably attached to and extending substantially across the rear end of said truck and having a first pocket and a spaced apart second pocket;
   a shaft mounted along said bumper and extending through said pockets;
   a first and a second receptacle each having a first arm and a second arm disposed at an angle with respect to each other, each said first arm having a hollow head through which said shaft is mounted and the end of said second arm having a tool receiving hole;
   means to rotate each said receptacle about said shaft.

8. An apparatus for mounting on the rear end of a truck which comprises:
   a bumper member non-rotatably attached to, and extending across the rear end of said truck and having a first pocket and a second pocket built into said bumper member;
   a first hydraulic cylinder supported from said bumper member and having a piston rod extending out one end of said hydraulic cylinder;
   a second hydraulic cylinder supported from said bumper member and having an end thereof having a piston rod extending outwardly;
   a first shaft portion and a second shaft portion supported from said bumper member;
   two receptacles each having a first arm and a second arm disposed at an angle with respect to each other, each said first arm having a hollow head through which one of said shaft portions is mounted and the second arm having a tool receiving means;
   means connecting an end of said piston rod of said first hydraulic cylinder to one of said receptacles and a second means connecting said piston rod of said hydraulic cylinder to the other of said receptacles whereby when said piston rods are extended, said receptacles rotate in one direction about said shaft portions and when said piston rods are retracted said receptacles rotate in the opposite direction.

* * * * *